US 8,832,651 B2

(12) United States Patent
Kibbar

(10) Patent No.: US 8,832,651 B2
(45) Date of Patent: Sep. 9, 2014

(54) CENTRAL SERVICE PROVISIONING SYSTEM

(75) Inventor: Amir Kibbar, Petah Tiqwa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 12/750,371

(22) Filed: Mar. 30, 2010

(65) Prior Publication Data
US 2011/0246976 A1 Oct. 6, 2011

(51) Int. Cl.
G06F 9/44 (2006.01)
G06F 9/445 (2006.01)

(52) U.S. Cl.
CPC .................................. G06F 9/44505 (2013.01)
USPC ............ 717/121; 717/100; 717/120; 717/170

(58) Field of Classification Search
CPC combination set(s) only.
See application file for complete search history.

(56) References Cited

U.S. PATENT DOCUMENTS

| | | | | |
|---|---|---|---|---|
| 7,058,924 B2 * | 6/2006 | Greenstein | ..................... | 717/100 |
| 7,185,071 B2 * | 2/2007 | Berg et al. | ..................... | 709/220 |
| 7,346,634 B2 * | 3/2008 | Fedorov | ................. | 1/1 |
| 7,954,087 B2 * | 5/2011 | Zenz et al. | ..................... | 717/121 |
| 8,001,528 B2 * | 8/2011 | Bernabeu-Auban et al. | . | 717/121 |
| 8,099,727 B2 * | 1/2012 | Bahat et al. | ..................... | 717/168 |
| 2002/0040469 A1 * | 4/2002 | Pramberger | ................. | 717/121 |
| 2004/0123285 A1 * | 6/2004 | Berg et al. | ..................... | 717/174 |
| 2004/0260678 A1 * | 12/2004 | Verbowski et al. | ................ | 707/3 |
| 2004/0260718 A1 * | 12/2004 | Fedorov | ........................ | 707/102 |
| 2006/0037000 A1 * | 2/2006 | Speeter et al. | ................ | 717/120 |
| 2007/0157172 A1 * | 7/2007 | Zenz et al. | ..................... | 717/121 |
| 2007/0261048 A1 * | 11/2007 | Bernabeu-Auban et al. | . | 717/170 |
| 2008/0301663 A1 * | 12/2008 | Bahat et al. | ..................... | 717/170 |
| 2009/0144700 A1 * | 6/2009 | Huff et al. | ..................... | 717/121 |
| 2009/0144701 A1 * | 6/2009 | Faus | ............................. | 717/121 |
| 2010/0281458 A1 * | 11/2010 | Paladino et al. | ............. | 717/106 |
| 2011/0107300 A1 * | 5/2011 | Vidal et al. | ..................... | 717/121 |
| 2011/0202529 A1 * | 8/2011 | Waschke | ....................... | 707/737 |

OTHER PUBLICATIONS

Dilip Soni; Software Architecture in Industrial Applications; 1995 ACM; pp. 196-207; <http://ieeexplore.ieee.org/xpls/abs_all.jsp?arnumber=5071105&tag=1>.*
Mark C. Chu-Carr et al.; Supporting Aggregation in Fine Grained Software Configuration Management; 2002 ACM; pp. 99-108; <http://dl.acm.org/citation.cfm?id=605482>.*
Reidar Conradi; Version Models for Software Configuration Management; 1998 ACM; pp. 232-282; <http://dl.acm.org/citation.cfm?id=280280>.*
Gall E. Kaiser et al.; An Architecture for Intelligent Assistance in Software Development; 1987 ACM; pp. 180-188; <http://dl.acm.org/citation.cfm?id=41783>.*

(Continued)

Primary Examiner — Thuy Dao
Assistant Examiner — Cuong V Luu

(57) ABSTRACT

A system, which implemented as programming on a suitable computing device, manages the configuration of a software system. The system includes a create properties configuration module that identifies and stores a collection of properties related to the configuration of the software system; a create file configuration that identifies and stores binary data related to the configuration of the software system; a create configuration set module that creates a draft configuration set including the collection of properties and the binary data; and an activate module that activates the draft configuration set and deactivates and persistently stores a prior configuration set as a historic configuration set. The activated configuration set and the historic configuration sets are immutable.

21 Claims, 6 Drawing Sheets

(56) References Cited

OTHER PUBLICATIONS

Alastair Reid et al.; Knit Component Composition for Systems Software; 2000 USENIX; 14 pages; <http://dl.acm.org/citation.cfm?id=1251253>.*

Jeff Magee et al.; Dynamic structure in software architectures; 1996 ACM; pp. 3-14; <http://dl.acm.org/citation.cfm?id=239104>.*

* cited by examiner

CENTRAL SERVICE PROVISIONING SYSTEM

BACKGROUND

Software systems implemented on hardware systems (e.g., individual computers, individual servers, server clusters, and computer networks) require some pre-execution and then post-execution configuration process to ensure the software systems function as intended. The configuration process may be very complicated and time consuming, and on some hardware systems, may not be feasibly done by a programmer or administrator.

DESCRIPTION OF THE DRAWINGS

The detailed description will refer to the following drawings in which like numbers refer to like items, and in which.

DETAILED DESCRIPTION

Figure 1:
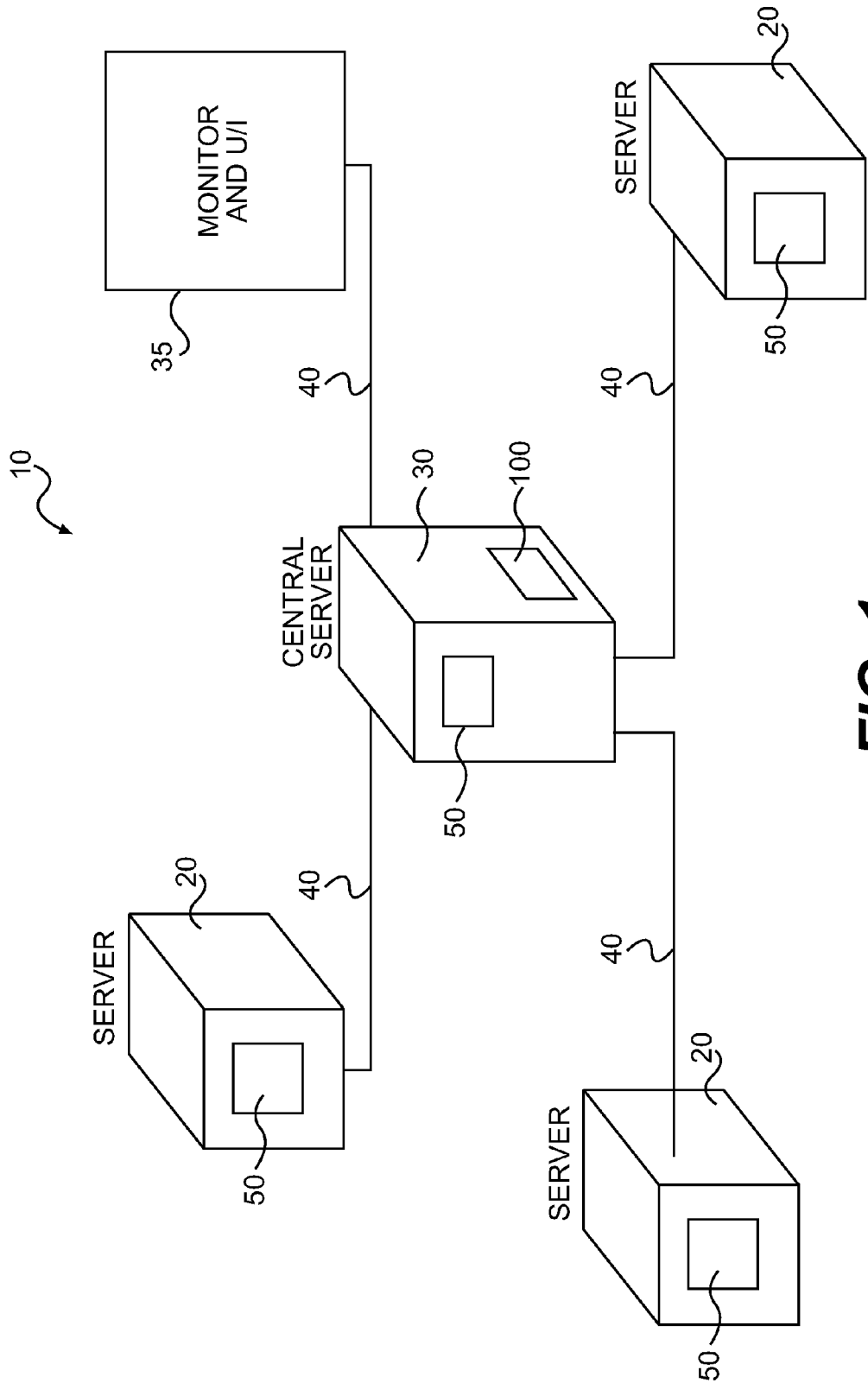
FIG. 1 illustrates a hardware system on which an exemplary central service provisioning system is implemented.

A central service provisioning system stores configuration sets for other software applications executing on a computer system. A configuration set includes Properties Configurations and File Configurations, described below, each of which in turn includes a number of individual configurations—one configuration exists for each configurable item in each application. Examples of configurable items include an IP address (for a Properties Configuration) and a binary data element such as a bit map (For a File Configuration). Each configuration set has a life cycle and can be administered by the central service provisioning system. A configuration set life cycle refers to the existence of that configuration set beginning with its formation as a draft configuration set, and modifications to the draft configuration set, activation of the draft configuration set, and finally, deactivation and persistent storage of the deactivated configuration as a historic configuration set.

The central service provisioning system allows easy integration among different applications that may be part of a larger solution, and allows the computer system user, or administrator, to manage configuration sets of the applications by providing, for example, rollback to previous configuration sets and staging new configuration sets. Such configuration management ordinarily would be more difficult, and possibly more critical, when the number, diversity, source, and interactions of individual applications in the larger solution increase. In fact, rollback in such a situation may be necessary to restore basic functionality to the larger solution. To enable such a rollback, the central service provisioning system retains an archive of each configuration set used in enacting the larger solution.

Users who purchase software for a computer system often buy a suite of software applications or products. The software suite may be intended to solve a particular problem or to serve an overall purpose. For example, a user may purchase an "office support" suite of software applications that include specific and individual word processing, spread sheet, accounting, image processing, email, performance monitoring, workload sharing, capacity utilization, and other software applications, all with the overall purpose or intention of supporting the day-to-day operations of the user's business and maximizing resource usage while minimizing expenditures. Another user may purchase a "business support" software suite consisting of an asset management application, a performance reporting application, and a discovery and dependency mapping application. The user expects these software suites to execute in a seamless fashion, and further expects that upgrades, modifications, and patches applicable to the applications to be made without degrading overall performance of the software suite or individual applications, or requiring extensive effort to implement. The reality is that such software nirvana seldom exists. Some of the applications may come from different vendors. Some applications may not work well with others, or otherwise may not integrate well into the software suites. Future changes or modifications to individual applications may have unknown or unintended consequences with respect to other applications in the software suite. Furthermore, while the user may select a number of applications that ultimately will complete the software suite, the user may elect to implement the software suite in stages such that not all applications are configured and running with the initial implementation of the software suite. This piece-wise implementation of the software suite also may have unknown or unintended consequences. Finally, the process of configuring the software suite, even if not done initially in a piece-wise fashion, likely will continue over the life cycle of the software suite as the aforementioned upgrades are implemented, and as, perhaps, new applications are added to the initial software suite.

One difficulty with initially configuring the software suite, and then updating that configuration set as the individual applications change, is that the applications consist of many thousands of properties. Manually accounting for these properties is, essentially, beyond the capacity of any programmer or administrator. Furthermore, whether attempted manually, or as directed by a configuration control program, such a configuration process may result in some mistakes. For example, addressing of certain application routines may be incorrect, such that an expected routine is not called when needed, and instead, a system error is reported. Still further, a change to some properties may cause errors to occur in the execution of the associated application, or some other application. In addition, the fact that each application in the software suite may be configured separately, using different technical terms, different configuration user interfaces (UIs), and different configuration activation schemes (i.e., some applications may take effect as soon as they are installed or changed, some may require a restart of a server or server cluster, and some may require only that a user log out and then log back in) makes seamless implementation of the software suite a challenge.

FIG. 1 illustrates a hardware system in which an exemplary central service provisioning system is implemented so as to provide a single "location" for initially configuring and subsequently managing and reconfiguring various applications to be executed on the hardware system, and for storing the initial configuration set, and each subsequent configuration set. Thus, the central service processing system is a single location, for all applications that are part of a software suite, to store and manage the application's individual configuration. The central service processing system manages the individual configurations, as a configuration set, and allows for editing, creating, deleting, and activating the software suite and its included application configurations, and for retaining a history of each configuration set.

Within the configuration set, each configuration may be a File Configuration or a Properties Configuration. A File Configuration contains binary data and is stored without decomposition of the binary data into subsets or smaller data elements: that is, the File Configuration is stored "as is." A Properties Configuration is a set of one or more properties, or name value pairs. A property can be any serializable data type, such as a string, number, or date, and also can be a multi-value representation of any data type. Each property may have associated metadata. An individual configuration also may have associated metadata.

In FIG. 1, a computing system, shown as a server cluster 10, includes a number of individual servers 20, and central server 30. The servers 20 and 30 are individual hardware platforms. The servers 20, 30 are connected using network 40. Network 40 may be a local area network (LAN) for example. Each of the individual servers 20 has installed software suite 50. The central server 30 has installed the same software suite 50, and in addition, central service processing system 100. The central service processing system 100 is used for initial configuration and activation of the software suites 50, for reconfiguration (editing, creating, and deleting) and activation of the reconfigured software suites 50, and for storing each configuration and reconfiguration of the software suites 50.

Coupled to the central server 30, is monitor and user interface 35. The monitor and user interface 35 allows a system administrator to interact directly with all or with selected elements of the central service provisioning system 100. In addition, the monitor and user interface 35 may receive and display SNMP alerts related to provisioning and configuration actions such as activation and deactivation of a configuration set (see FIG. 4).

In an alternative arrangement of the system 10, some elements of the central service processing system 100 may be implemented on one or more of the individual servers 20. These alternative arrangements will be described in more detail with reference to FIGS. 5A and 5B.

In FIG. 1, the individual servers 20 are shown in communication with the central server 30 using network 40. The actual means of communications between a specific server 20 and the central server 30 can vary. For example, one server 20 may use Spring remoting, another may use Representational State Transfer (REST), still another may use Java Management Extensions (JMX), and another may use Simple Object Access Protocol (SOAP).

Figure 2:
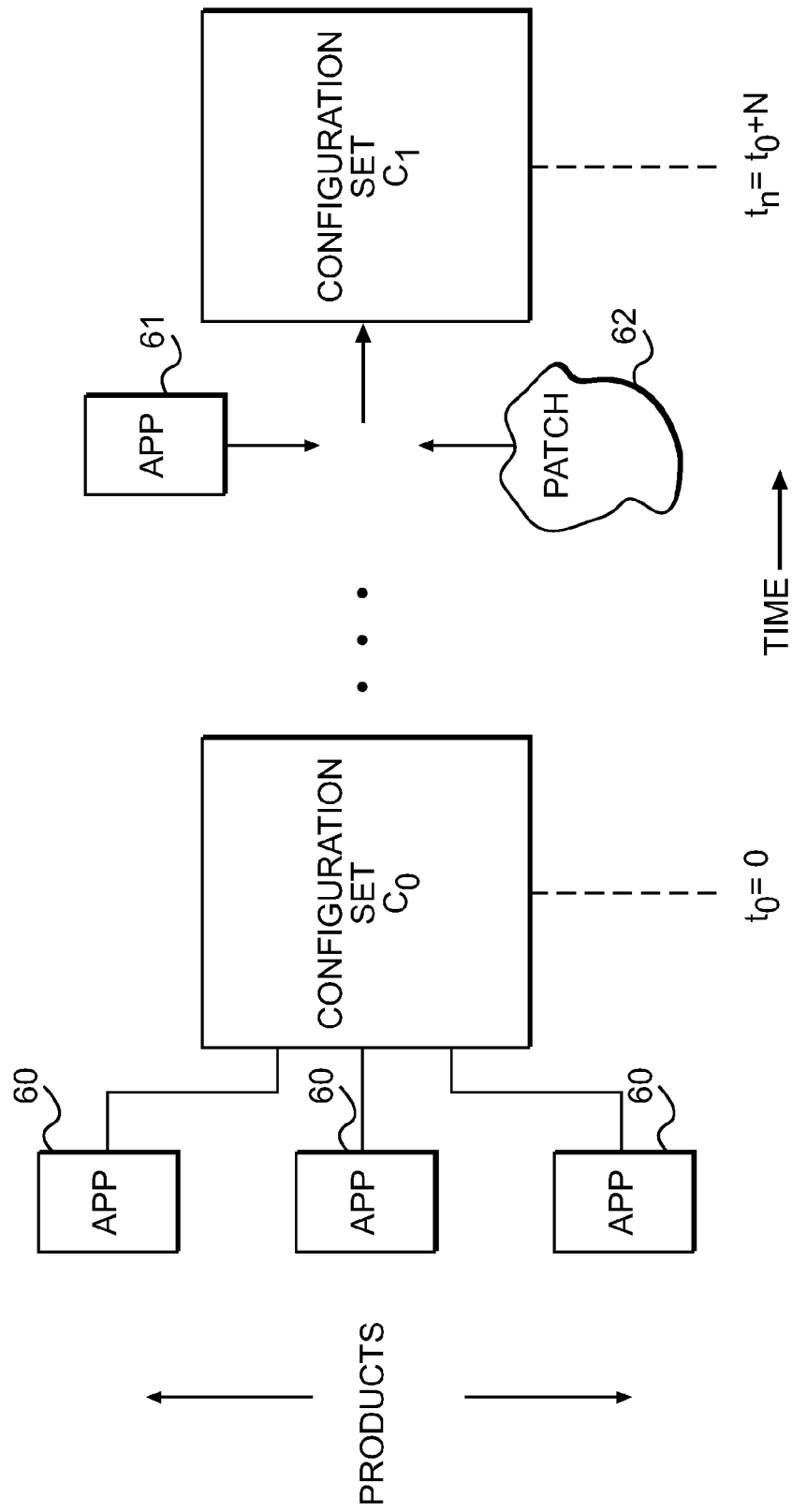
FIG. 2 illustrates, conceptually, an exemplary configuration process.

FIG. 2 illustrates, conceptually, the configuration and reconfiguration processes that occur on the server cluster 10 under control of the central service provisioning system 100. In FIG. 2, at time (t0) of initial installation and configuration, software suite 50 includes individual applications 60. The central service provisioning system 100 is used to configure each of the applications 60 so that the software suite 50 receives an initial configuration (configuration set c0). The central server processing system 100 then stores this initial configuration set c0 as the active configuration set. At some subsequent time t1, the software suite 50 is changed, or reconfigured, to add a new application 61 and a patch 62, resulting in new configuration set c1. The central service processing system 100 then stores the new configuration set c1 as the active configuration set, while maintaining the configuration set c0 in a persistent store (database) of prior, historic configuration sets c.

The configuration sets created using the central service processing system 100 are, in an embodiment, Java Persistence API (JPA) entities, and in an embodiment may be exposed as such. In another embodiment, the configuration sets may be exposed by exporting the entire configuration set c to a collection of stored java.util.Properties files (originating from Properties Configurations) and data files (originating from File Configurations), in conjunction with a collection of java.util.Properties files that describe the metadata associated with each Properties Configuration. A configuration set also may be exposed using a plain old Java object (POJO) that represents the configuration set, by an XML representation of the configuration set, and by using JMX to manage and read the configuration set.

The Properties Configuration and the File Configuration share certain attributes. These shared attributes include a display name, a description, a unique identification (ID), and metadata, typically a collection of name/value pairs that contain data relevant to the consumer of the configuration. In an embodiment, both the Properties Configuration and the File Configuration may be hidden from a user interface-representation of the configuration set, but both files still reside in the configuration set and can be manipulated by the central service provisioning system 100 (programmatically only in this embodiment—i.e., the system administrator cannot access the files for any purpose).

The Properties Configuration may also be a JPA entity and may be exposed as a POJO representation. A programmer may provide a proxy interface that has strongly typed getters and setters for the properties enumerated in the Properties Configuration. Most generally, "strong typing" implies that the programming language places severe restrictions on the intermixing that is permitted to occur, preventing the compiling or running of source code which uses data in what is considered to be an invalid way. For instance, an integer division operation may not be used on strings; a procedure that operates upon linked lists may not be used on numbers. However, the nature and strength of these restrictions is highly variable. The proxy interface allows translation of getter/setter method calls into reads/puts to an internal properties map within the JPA entity. In this way, all Properties Configurations in a configuration set will be represented by a single JPA entity, and can be stored in a single database table. However, since the Properties Configuration is a collection of properties, the Properties Configuration also is exposed as a java.util.Properties object. The Properties Configuration includes as attributes, interface name and collection of name/value pairs, which are the properties.

The File Configuration holds binary data within the configuration set, and has in addition to the configuration set attributes, the attributes file name, file binary data, and a checksum.

Figure 3:
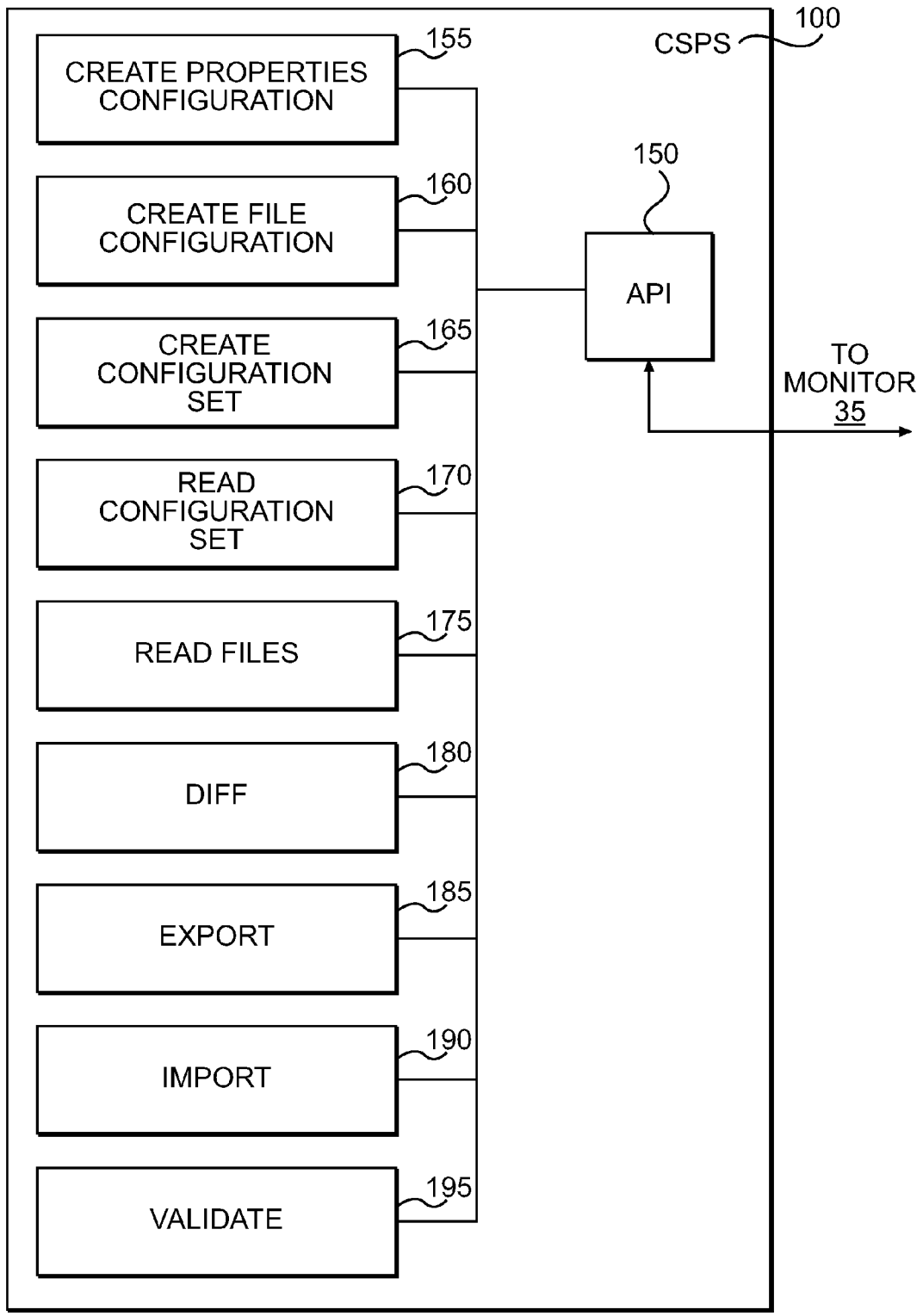
FIG. 3 illustrates examples of discrete components of the exemplary central service provisioning system of FIG. 1.

To access a configuration set, the central service processing system 100, shown in more detail in FIG. 3, includes configuration set API 150. Through the API 150, the central service processing system 100 accesses the following functional modules:

Create Properties Configuration 155—which creates a Properties Configuration and obtains an enhanced proxy of the configuration interface. The Properties Configuration thus created is added to an existing configuration set.

Create File Configuration 160—which creates a File Configuration and adds the File Configuration to an existing configuration set.

Create Configuration Set 165—which creates an empty configuration set c or a copy of an existing configuration set.

Read Configuration Set 170—which reads the content of a configuration set based on various criteria including configuration set ID (e.g., set c0), draft number, activated, and name, for example.

Read Files 175—which reads contents of a file directly from a configuration set.

Diff 180—which compares two configuration sets and outputs a difference statement.

Export 185—which exports all of, or parts of, a configuration set to a zip dump file.

Import 190—which creates a draft configuration set from the zip dump file.

Validate 195—which runs a validation routine on a configuration set to verify its internal integrity.

One use of the export/import modules is to migrate a configuration set from one running environment to another. For example, the export/import modules allow a user to migrate a configuration set from a test/staging environment to a production environment. In combination, the export/import module functions and the life cycle features provide significant advantages—allowing a user to export a configuration from a test/staging environment, and import it to a production environment as a draft configuration set. This migration can be done with zero downtime to the production system.

Once imported, a configuration set that was originated from the test/staging environment might require some editing. For example, in the production system, IP address of integrated systems that reside in the configuration set may be different from those in the test/staging environment. The user can edit those properties, setting specific configuration required only in the production environment—all with zero downtime to the production system.

Once edited and ready, the configuration set can be implemented in a very short change window, since all that is required is to activate the imported and edited configuration set. Thus, versioning of configuration sets and retaining history enables some significant features and services:

Configuration set drafts—non-activated configuration sets—allow for all of the functionality listed above.

Historic—un-modifiable configuration sets are used for rolling back to a known working configuration set and to help support teams resolve issues by comparing a working configuration set with one that causes a problem.

In combination with the export/import—allows for near zero down time for configuration change in a system and for creating staging environments and migrating them to a production environment.

Figure 4:
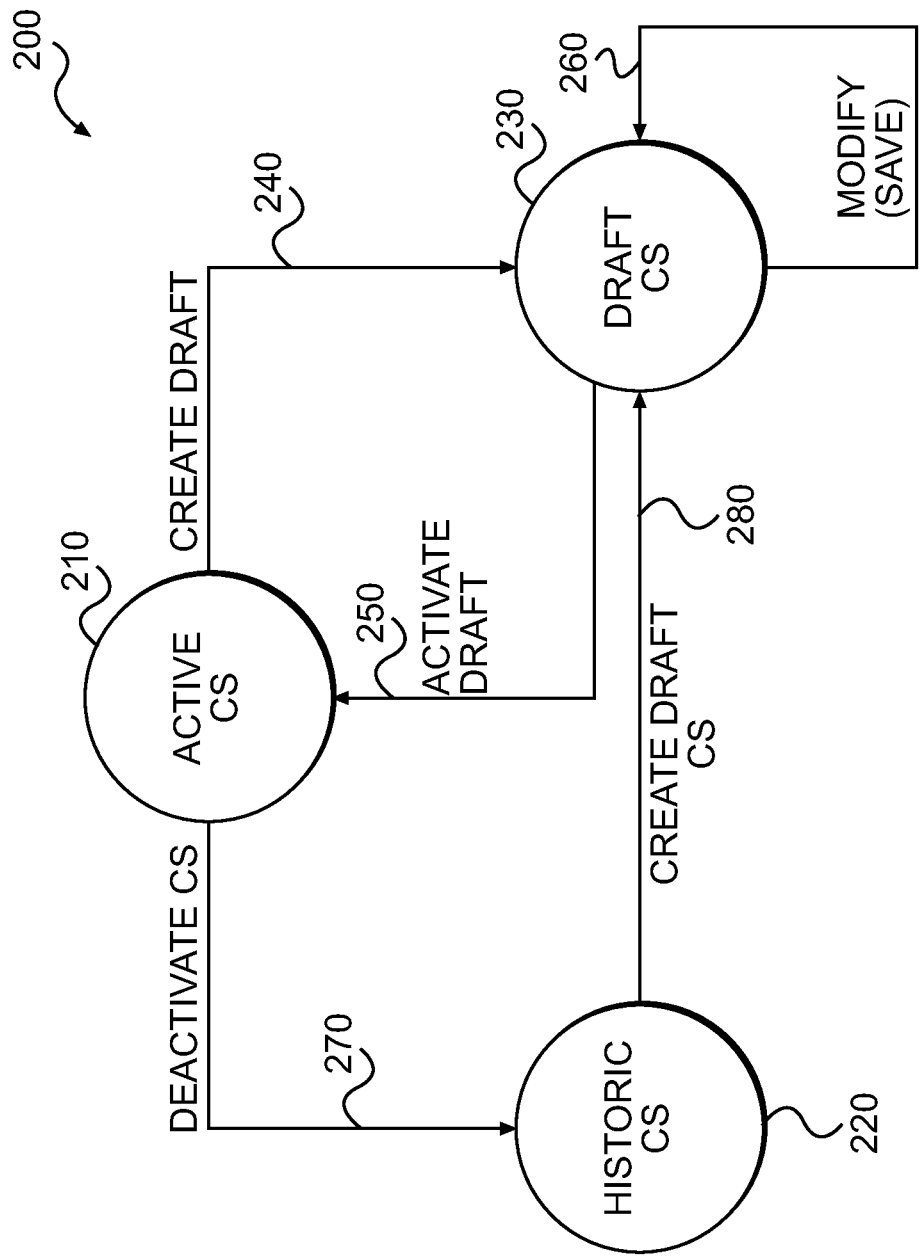
FIG. 4 illustrates an exemplary life cycle of a configuration set generated using the central service processing system of FIG. 1.

Each configuration set has its own life cycle, which protects used (i.e., activated and activated) versions of the configuration set from being modified. Each version of a configuration set is created first in a draft mode. A draft configuration set has a name and can be modified any number of times. The draft configuration set represents a future configuration of a system (e.g., the system 10 of FIG. 1) to which it applies. The draft configuration set can be activated at any time, such as during a scheduled system maintenance outage. Once a draft configuration set is activated, it no longer can be modified, and the configuration set is in an active state. If another (subsequent draft configuration set) is activated, the current active configuration set c is deactivated and becomes a historic configuration set. The historic configuration sets are maintained in a persistent store or database by the central service provisioning system 100. Historic configuration sets also cannot be modified. However, a historic configuration set can be used to generate a new draft configuration set. The newly created draft configuration set then can be modified and activated, becoming a new active configuration set. FIG. 4 illustrates the configuration set life cycle.

FIG. 4 shows three configuration sets. Active configuration set 210 is active and represent the configuration of software executing on, or capable of execution on an underlying hardware system or platform, such as the system 10 of FIG. 1. Historic configuration set 220 is a previously active configuration set that has been deactivated (path 270) and now is maintained by the central service processing system 100 (see FIG. 2). Draft configuration set 230 may be created from an historic configuration set (path 280), or an active configuration set (path 240). The draft configuration set 230 may be modified (path 260). Finally, the draft configuration set 230 may be activated (path 250) causing deactivation of the currently active configuration set 210.

The Properties Configuration created by the central service processing system 100 is exposed (e.g., using POJO) to different users in different ways. However, a programmer on the system 10 may not want to use a java.lang.Properties object of a derivative because such an object does not meet standard programming idioms such as strongly typed content. Thus, the central service provisioning system 100, in an embodiment, incorporates or provides for the creation of user-defined interfaces and provides a proxy that implements these user-defined interfaces and translates the method calls to look-ups in the properties configuration map.

Taking as an example a configuration set with a single Properties Configuration that represents the configuration of an application module called "the alerts module," the Properties Configuration will be enhanced by the following user-provided interface:

```
public interface AlertConfiguration extends Configuration {
    @PropertyDefinition(hidden = true)
    public String getName( );
    public Pattern getPattern( );
    public Boolean isEnabled( );
    public void setEnabled(Boolean enabled);
    public void setName(String name);
    public void setPattern(Pattern pattern);
}
```

The above string shows a simple interface with getters and setters. This interface may be implemented by a proxy that translates an invocation of "getPattern( )", for example, to the "pattern" property in the Properties Configuration.

This user-defined interface capability allows the programmer to use strongly typed interfaces while seamlessly storing files in the configuration set database. The @PropertyDefinition allows for fine grained tuning of each property by introducing property level metadata (for example hidden, requires restart, display key, etc.).

In both the @PropertyDefinition and the @ConfigurationDefinition there is a user metadata property that allows the programmer to add user-defined metadata on each property and configuration.

Since metadata is allowed on each property and configuration, it easy to develop user metadata that allows the programmer to create a generic user interface that reads the configuration set and displays it to the programmer. Such a metadata language is supplied with the central service provisioning system 100 along with a user interface 35 (see FIG. 1) that displays the configuration set (as a tree, for example), displays different choosers for properties (such as date chooser, color chooser, etc.), default values or a closed set of values for a property, and many more user interface features.

As part of the central service provisioning system 100, activation logic may be embedded in each consuming application since some application might require a single active configuration and other applications may require several simultaneously active configurations (for example, in multi-tenant applications each tenant may run using a different configuration set). However, each configuration set will have an active marker to indicate whether or not the specific configuration set is a currently active configuration set.

The dump file is a simple zip-packaged set of properties files and regular files. The properties files represent the Properties Configurations and the regular files represent the File Configurations. However File Configurations are represented by two files: the content file itself and a metadata file. Properties Configuration does not require an accompanying metadata since its metadata is stored on the application interfaces using annotations—this metadata is resolved at runtime.

The naming convention of the files within the zip is as follows:

Properties Configurations: <fully-qualified-application-interface-name>-<UUID>.properties File Configurations:
<file-name>-<file-extension>
<file-name>-<UUID>.metadata Dump files are human readable so that it is easy to access, review and store dump files.

Validation of a configuration set may be desired when importing, activating or even updating the configuration set. The user may want to know that the properties and files updated in the configuration set are a valid configuration. Validation is made possible using a combination of a JSR-303 mechanism and a custom validation mechanism.

Using JSR-303 annotation on the Properties Configurations application interfaces it is possible to validate the integrity of each property. A custom validation allows validating a configuration and a configuration set as a whole. This is especially useful for validating File Configurations on which JSR-303 annotations cannot be placed.

Comparison of configuration sets is done using the UUIDs of the configurations and of each property. Since there could be multiple configurations with the same name (for example, two or more File Configurations with the same filename in the same configuration set, two or more Properties Configuration of the same application interface in the same configuration set) the only connecting thread between the configurations is their UUID. The result of the comparison is a list of differing items with both left and right hand side values of the comparison.

Some applications may use or require a tree of configurations within a configuration set. All configurations within the configuration set are independent. However, it is possible to create a virtual dependency using the configuration UUIDs. This is done by adding a configuration file that holds the dependency tree. The structure of the files is a simple properties file in which the keys are UUIDs of the nodes in the tree and the value is a comma separated list of leaf UUIDs.

Figure 5A:
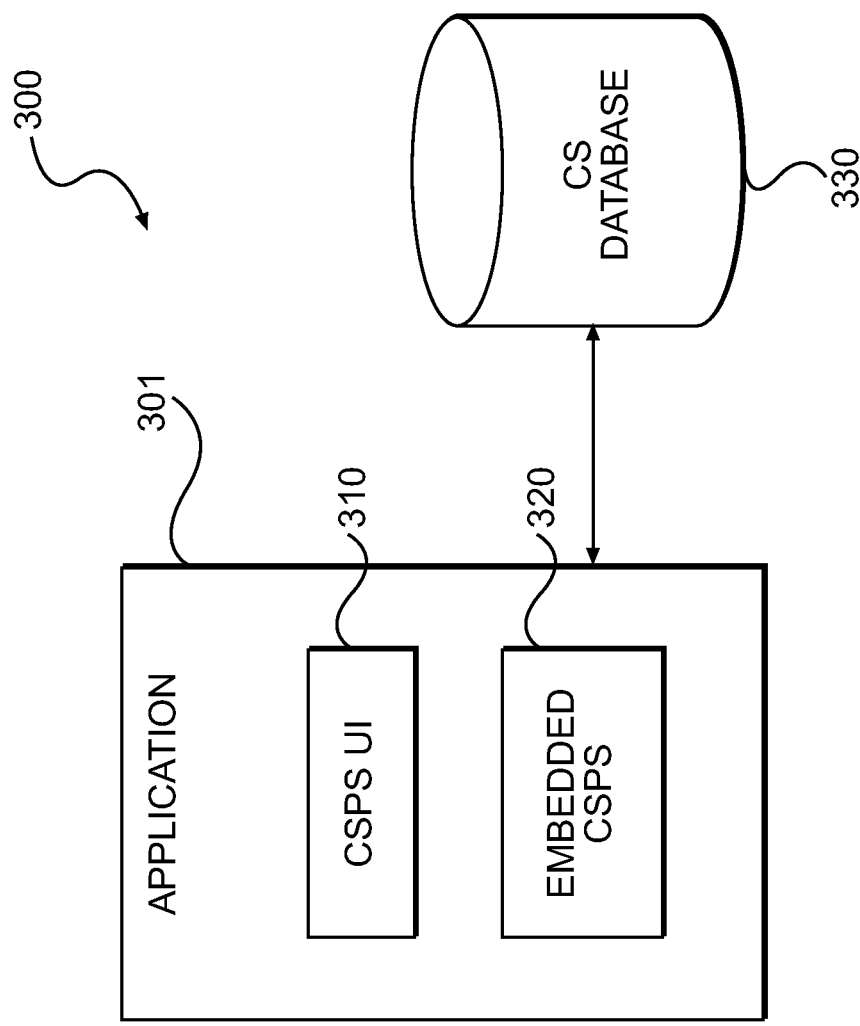
FIGS. 5A and 5B illustrate alternative arrangements of the central service processing system of FIG. 1 on various hardware platforms.
Figure 5B:
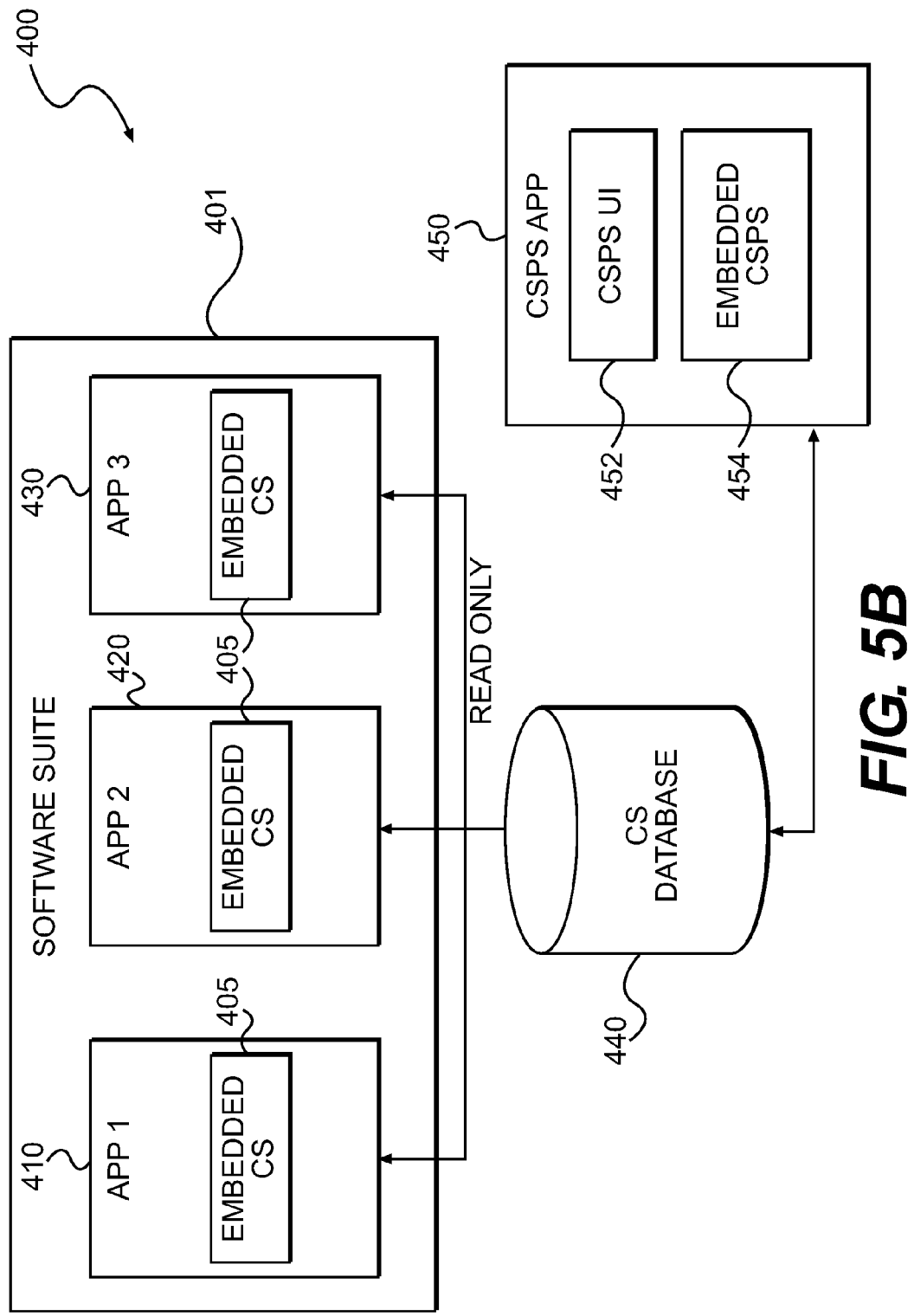

As noted with respect to FIG. 1, the specific implementation of the central service provisioning system 100 may depend on the configuration of the underlying hardware system on which the system 100 software resides. FIGS. 5A and 5B illustrate alternative, exemplary implementations of the central service provisioning system 100. In FIG. 5A, system 300 includes server 301, and the central service provisioning system is implemented on the server 301 as part of a standalone software package. The central service provisioning system includes embedded CSPS 320 and CSPS UI 310. The CSPS 320 and CSPS UI 310 perform the same functions as the central service provisioning system 100 and the coupled monitor and user interface 35 of FIG. 1. The CSPS 320 maintains a persistent store of historic configuration sets in data store 330.

In FIG. 5B, computing system 400 includes software suite 401, which may be implemented on one or more hardware platforms (not shown). Within software suite 401 are applications 410, 420, and 430. Each application 410, 420, and 430 includes an embedded CSPS 405. The embedded CSPS 405 reads (only) configuration set data from configuration set data store 440. A separate CSPS application 450, including CSPS UI 452 and embedded CSPS 454 are used to manage, change, create, and activate configuration sets.

What is claimed is:

1. A system to manage a configuration of a software system, comprising:
a non-transitory machine-readable medium having program instructions executable by a processor to access a number of modules, wherein the number of modules comprise:
a create properties configuration module that identifies and stores a collection of properties related to the configuration of the software system;
a create file configuration module that identifies and stores binary data related to the configuration of the software system;
a create configuration set module that creates a configuration set including the collection of properties and the binary data;
an export module to export at least a part of the configuration set to a file;
an import module to create a draft configuration set from the at least a part of the configuration set in the file to migrate the at least part of the configuration set from a test environment to a production environment; and
an activate module that activates the draft configuration set and deactivates and persistently stores a prior configuration set as the historic configuration set, wherein the activated configuration set and the historic configuration sets are immutable.

2. The system of claim 1, wherein the configuration set is created by the create configuration set module that:
saves a historic configuration set as the configuration set; and
modifies the configuration set based on a comparison of the historic configuration set and a deactivated configuration set that caused an error to avoid the error, wherein the comparison of the configuration sets uses universal unique identifiers (UUIDs) of the compared configuration sets and each property of the configuration sets.

3. The system of claim 1, wherein the properties comprise a plurality of name/value pairs, and wherein the properties configuration further comprises an interface name through which the properties configuration is exposed.

4. The system of claim 1, wherein the properties configuration and the file configuration comprise shared attributes of display name, description, hidden, and unique user identification.

5. The system of claim 1, wherein the configuration set is created based on the active configuration set.

6. The system of claim 5, wherein the configuration set is modified.

7. The system of claim 1, comprising a user interface and monitor module that permits a user to interact with the system.

8. The system of claim 7, wherein the user interface and monitor module comprises a generic interface to the properties configuration and the files configuration.

9. The system of claim 7, wherein a user interaction with the system comprises creating a custom interface to the properties configuration.

10. The system of claim 1, wherein the software system is distributed over a plurality of hardware platforms in communication over a network, wherein software at each hardware platform includes an embedded read-only instance of the system, and wherein one hardware platform of the plurality of platforms comprises a read/write instance of the system, the read/write instance of the system creating, activating, and deactivating configuration sets applicable to the software system.

11. A software management and versioning system comprising:
a non-transitory machine-readable medium having program instructions executable by a processor to:
cause a create draft configuration set mechanism to create a draft configuration set defining properties of a software suite installed on the computing system;
cause an export module to export at least a part of the draft configuration set to a file;
cause an import module to create a configuration set from the at least a part of the draft configuration set in the file to migrate the at least part of the draft configuration set from a test environment to a production environment; and
cause an activate configuration set mechanism to activate the configuration set and deactivate a previously active configuration set and persistently store the deactivated configuration set as the historic configuration set in a data store, wherein the active and historic configuration sets cannot be modified.

12. The software management and versioning system of claim 11, wherein the draft configuration set is created based on one of the active configuration set or from a user-defined set of values.

13. The software management and versioning system of claim 11, wherein a configuration set of the software suite is rolled back to a prior active configuration set by importing the prior active configuration set from the data store to a user interface.

14. The software management and versioning system of claim 13, wherein the user interface comprises a generic interface into the imported configuration set.

15. The software management and versioning system of claim 13, wherein the user interface comprises a customized user-interface into the configuration set.

16. The software management and versioning system of claim 11, wherein a configuration set comprises a file configuration and a properties configuration, wherein the properties configuration and the file configuration comprise shared attributes of display name, description, hidden, and unique user identification, the properties configuration comprises a collection of properties, wherein the properties comprise a plurality of name/value pairs, and wherein the properties configuration comprises an interface name through which the properties configuration is exposed, wherein the file configuration comprises binary data related to the configuration file, and wherein the file configuration and the properties configuration comprise user-specific metadata.

17. The software management and versioning system of claim 11, wherein the software management and versioning system is embedded in a software suite installed on the computing system.

18. The software management and versioning system of claim 11, wherein read-only elements of the software management and versioning system are embedded in software applications that comprise a software suite of the computing system, and a read/write instance of the software management and versioning system is installed separate from the software suite to create, activate, and deactivate configuration sets defining configurations of the software suite.

19. A software management and versioning control system comprising:
a non-transitory machine-readable medium having program instructions executable by a processor to:
define a properties configuration of a software suite installed on the computing platform;
define a files configuration of the software suite;
create a software suite draft configuration set based on the properties configuration and the files configuration, wherein the program instructions executable to create the draft configuration set includes instructions to save a historic configuration set as the draft configuration set;
export at least a part of the draft configuration set to a file;
modify the at least part of the draft configuration set based on a comparison of the historic configuration set and a deactivated configuration set that caused an error; and
import the modified at least part of the draft configuration set to migrate the draft configuration set from a test environment to a production environment.

20. The software management and versioning control system of claim 19, comprising:
deactivate a current active configuration set upon activation of the draft configuration set; and
store a deactivated configuration set as a historic configuration set in a persistent store.

21. The software management and versioning control system of claim 19, comprising a user interface, comprising:
a generic interface to a configuration set; and
a user-created customized interface to the configuration set.

* * * * *